United States Patent
Anderson et al.

(10) Patent No.: US 9,507,653 B2
(45) Date of Patent: Nov. 29, 2016

(54) INTER-PROCESS COMMUNICATION CHANNEL

(75) Inventors: Benjamin J. Anderson, Seattle, WA (US); Michael C. Fanning, Redmond, WA (US); Timothy S. Rice, Seattle, WA (US); Andrew R. Sterland, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 286 days.

(21) Appl. No.: 13/612,299

(22) Filed: Sep. 12, 2012

(65) Prior Publication Data

US 2014/0075451 A1 Mar. 13, 2014

(51) Int. Cl.
  G06F 13/00 (2006.01)
  G06F 9/54 (2006.01)
(52) U.S. Cl.
  CPC ................................. G06F 9/546 (2013.01)
(58) Field of Classification Search
  None
  See application file for complete search history.

(56) References Cited

U.S. PATENT DOCUMENTS

| | | | |
|---|---|---|---|
| 6,298,474 B1* | 10/2001 | Blowers et al. | 717/104 |
| 6,393,437 B1 | 5/2002 | Zinda et al. | |
| 7,200,671 B1 | 4/2007 | Lev-Ami et al. | |
| 7,965,275 B1* | 6/2011 | Lew | G06F 9/4446 345/156 |
| 2001/0047436 A1* | 11/2001 | Sexton et al. | 709/316 |
| 2003/0046664 A1* | 3/2003 | Pangburn | G06F 11/3636 717/125 |
| 2006/0200805 A1* | 9/2006 | Agarwala et al. | 717/124 |
| 2007/0195698 A1* | 8/2007 | Briscoe | H04L 12/14 370/235 |
| 2008/0080543 A1* | 4/2008 | Hickox | H04L 12/4625 370/419 |
| 2009/0083425 A1* | 3/2009 | Bozak et al. | 709/226 |
| 2009/0228861 A1 | 9/2009 | Burton | |
| 2009/0235282 A1* | 9/2009 | Meijer | G06F 9/547 719/320 |
| 2010/0002000 A1* | 1/2010 | Everitt et al. | 345/426 |
| 2010/0023951 A1 | 1/2010 | Violleau et al. | |
| 2011/0047613 A1 | 2/2011 | Walsh | |
| 2011/0107311 A1 | 5/2011 | McNulty et al. | |
| 2012/0110462 A1* | 5/2012 | Eswaran et al. | 715/736 |
| 2012/0166276 A1* | 6/2012 | Chitnis et al. | 705/14.49 |

OTHER PUBLICATIONS

"Remote Tools", Retrieved at <<http://msdn.microsoft.com/en-us/library/ms894600.aspx, Retrieved Date: Dec. 30, 2011, 2 Pages.
"Step by Step: Using Microsoft Device Emulator In-Depth in Your Application Development Experience", Retrieved at <<http://msdn.microsoft.com/en-us/library/bb278114.aspx>>, Apr. 7, 2010, 18 Pages.

* cited by examiner

*Primary Examiner* — Umut Onat
(74) *Attorney, Agent, or Firm* — Kevin Sullivan; Kate Drakos; Micky Minhas

(57) ABSTRACT

Techniques are described herein that are capable of constructing an inter-process communication channel, for example, between a requesting component and a targeted process. The communication channel may have one or more links, such that each link is defined by a respective node pair in a plurality of nodes. The plurality of nodes includes the requesting component, the targeted process, and optionally one or more intermediate nodes. An attachment request is received via a user interface. The requesting component is attached to the targeted process. For instance, the links may be traversed to discover the targeted process. The communication channel is established. For instance, in each node of a subset of the plurality of nodes, node information may be retained to indicate a next consecutive node of the plurality of nodes to which messages from the requesting component to the targeted process are to be delivered.

20 Claims, 7 Drawing Sheets

INTER-PROCESS COMMUNICATION CHANNEL

BACKGROUND

Historically, tooling functionality for web applications (e.g., msn.com, google.com, yahoo.com, facebook.com, etc.) is tightly coupled with the web applications. For instance, tools for a web browser (e.g., F12 tools for Internet Explorer® or Chrome tools for Google Chrome®) typically are integrated into the browser. Increasingly, however, applications that are external to web applications are providing tooling functionality for such web applications. Applications that are capable of performing tooling operations with respect to a web application are often referred to as requesting applications or tooling applications. The web applications on which tooling operations are performed are commonly referred to as targeted applications.

Performing tooling operations on web applications by requesting applications that are external to the web applications provides some challenges because information that is historically provided within web application tools (e.g., hypertext markup language (HTML) views, console windows, etc.) may not easily be provided to the requesting applications. Furthermore, web application code is often most easily inspected, modified, etc. in context of a dynamic language such as JavaScript®/HTML. However, it can be challenging to augment a callable application programming interface (API) within a targeted application and/or to provide a sufficient level of isolation from dynamic language code of a web application to ensure its integrity. Moreover, conventional approaches for diagnosing web applications may encounter difficulty with respect to new web devices (e.g., tablet computers) and/or platforms (e.g., ARM) in which limited resources or the newness of the architecture may inhibit utilization of existing integrated development environment (IDE) and/or integrated web application (e.g., web browser) techniques.

SUMMARY

Various approaches are described herein for, among other things, constructing an inter-process communication channel. For instance, the inter-process communication channel may be constructed between a requesting component and a specified targeted process. Examples of a requesting component include but are not limited to a process (e.g., an application or a service), a hosted component (e.g., a dynamic language execution engine, a component object model (COM) object, a dynamically loaded dynamic-link library (DLL), etc. A dynamic language execution engine is a component (e.g., software, hardware, firmware, or any combination thereof) that is capable of compiling, executing, and/or interpreting dynamic language code. The dynamic language execution engine may be capable of performing other operations with respect to the dynamic language code, including but not limited to accepting, parsing, etc. A dynamically loaded DLL is a component that is not directly compiled into a process; rather, the DLL is dynamically loaded into a process after start-up.

An example method of constructing a communication channel between a requesting component and a specified targeted process is described. In accordance with this method, an attachment request is received via a user interface. For instance, the attachment request may indicate that the requesting component is to be attached to the specified targeted process. The attachment request includes a node indicator that specifies an order of a plurality of nodes with respect to which the communication channel is to be constructed. The requesting component may be an originating node of the plurality of nodes. The specified targeted process may be a destination node of the plurality of nodes. The requesting component is external to the specified targeted process. An availability query is provided to the requesting component. The availability query causes the requesting component to determine available nodes based on receipt of availability indicators from the respective available nodes. Each of the availability indicators specifies that the respective available node is capable of communicating with the requesting component. The specified targeted process is selected from available nodes based on the node indicator. The requesting component attaches to the specified targeted process to establish the communication channel therebetween. A reference to the specified targeted process is stored. The reference indicates that messages from the requesting component are to be sent to the specified targeted process via the communication channel while the requesting component is attached to the specified targeted process.

An example method of constructing a communication channel having links between a requesting component and a specified targeted process is described. In accordance with this method, an attachment request is received via a user interface. For instance, the attachment request may indicate that the requesting component is to be attached to the specified targeted process. The requesting component is external to the specified targeted process. The requesting component is attached to the specified targeted process. Attaching the requesting component to the specified targeted process includes traversing the links to discover the specified targeted process. Each of the links is defined by a respective pair of nodes in a plurality of nodes. The requesting component may be an originating node of the plurality of nodes. The specified targeted process may be a destination node of the plurality of nodes. The plurality of nodes includes intermediate node(s) between the requesting component and the specified targeted process. The communication channel is established. Establishing the communication channel includes, in each node of a subset of the plurality of nodes, retaining node information regarding a next consecutive node of the plurality of nodes to which messages from the requesting component to the specified targeted process are to be delivered. The subset includes the requesting components and the intermediate node(s).

An example system to construct a communication channel between a requesting component and a specified targeted process is described. The system includes query logic, selection logic, attachment logic, and storage logic. The query logic is configured to provide an availability query to the requesting component in response to receipt of an attachment request via a user interface. For instance, the attachment request may indicate that the requesting component is to be attached to the specified targeted process. The attachment request includes a node indicator that specifies an order of a plurality of nodes with respect to which the communication channel is to be constructed. The requesting component may be an originating node of the plurality of nodes. The specified targeted process may be a destination node of the plurality of nodes. The requesting component is external to the specified targeted process. The availability query causes the requesting component to determine available nodes based on receipt of availability indicators from the respective available nodes. Each of the availability indicators specifies that the respective available node is capable of communicating with the requesting component.

The selection logic is configured to select the specified targeted process from the available nodes based on the node indicator. The attachment logic is configured to attach the requesting component to the specified targeted process to establish the communication channel therebetween. The storage logic is configured to store a reference to the specified targeted process. The reference indicates that messages from the requesting component are to be sent to the specified targeted process via the communication channel while the requesting component is attached to the specified targeted process.

An example system to construct a communication channel having links between a requesting component and a specified targeted process is described. The system includes attachment logic and establishment logic. The attachment logic is configured to attach the requesting component to the specified targeted process in response to receipt of an attachment request via a user interface. For instance, the attachment request may indicate that the requesting component is to be attached to the specified targeted process. The requesting component is external to the specified targeted process. The attachment logic includes traversal logic. The traversal logic is configured to traverse the links to discover the specified targeted process. Each of the links is defined by a respective pair of nodes in a plurality of nodes. The requesting component may be an originating node of the plurality of nodes. The specified targeted process may be a destination node of the plurality of nodes. The plurality of nodes includes intermediate node(s) between the requesting component and the specified targeted process. The establishment logic is configured to establish the communication channel. The establishment logic includes retaining logic. The retaining logic is configured to retain node information in each node of a subset of the plurality of nodes regarding a next consecutive node of the plurality of nodes to which messages from the requesting component to the specified targeted process are to be delivered. The subset includes the requesting components and the intermediate node(s).

A computer program product is described that includes a computer-readable medium having computer program logic recorded thereon for enabling a processor-based system to construct a communication channel between a requesting component and a specified targeted process. The computer program product includes a first program logic module, a second program logic module, a third program logic module, and a fourth program logic module. The first program logic module is for enabling the processor-based system to provide an availability query to the requesting component in response to receipt of an attachment request via a user interface. For instance, the attachment request may indicate that the requesting component is to be attached to the specified targeted process. The attachment request includes a node indicator that specifies an order of a plurality of nodes with respect to which the communication channel is to be constructed. The requesting component may be an originating node of the plurality of nodes. The specified targeted process may be a destination node of the plurality of nodes. The requesting component is external to the specified targeted process. The availability query causes the requesting component to determine available nodes based on receipt of availability indicators from the respective available nodes. Each of the availability indicators specifies that the respective available node is capable of communicating with the requesting component. The second program logic module is for enabling the processor-based system to select the specified targeted process from the available nodes based on the node indicator. The third program logic module is for enabling the processor-based system to attach the requesting component to the specified targeted process to establish the communication channel therebetween. The fourth program logic module is for enabling the processor-based system to store a reference to the specified targeted process. The reference indicates that messages from the requesting component are to be sent to the specified targeted process via the communication channel while the requesting component is attached to the specified targeted process.

A computer program product is described that includes a computer-readable medium having computer program logic recorded thereon for enabling a processor-based system to construct a communication channel having links between a requesting component and a specified targeted process. The computer program product includes a first program logic module and a second program logic module. The first program logic module is for enabling the processor-based system to attach the requesting component to the specified targeted process in response to receipt of an attachment request via a user interface. For instance, the attachment request may indicate that the requesting component is to be attached to the specified targeted process. The requesting component is external to the specified targeted process. The first program logic module includes logic for enabling the processor-based system to traverse the links to discover the specified targeted process. Each of the links is defined by a respective pair of nodes in a plurality of nodes. The requesting component may be an originating node of the plurality of nodes. The specified targeted process may be a destination node of the plurality of nodes. The plurality of nodes includes intermediate node(s) between the requesting component and the specified targeted process. The second program logic module is for enabling the processor-based system to establish the communication channel. The second program logic module includes logic for enabling the processor-based system to retain node information in each node of a subset of the plurality of nodes regarding a next consecutive node of the plurality of nodes to which messages from the requesting component to the specified targeted process are to be delivered. The subset includes the requesting components and the intermediate node(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example channel construction system in accordance with an embodiment.

FIGS. 2, 3, and 5 depict flowcharts of example methods for constructing a communication channel according to embodiments.

Figure 1:
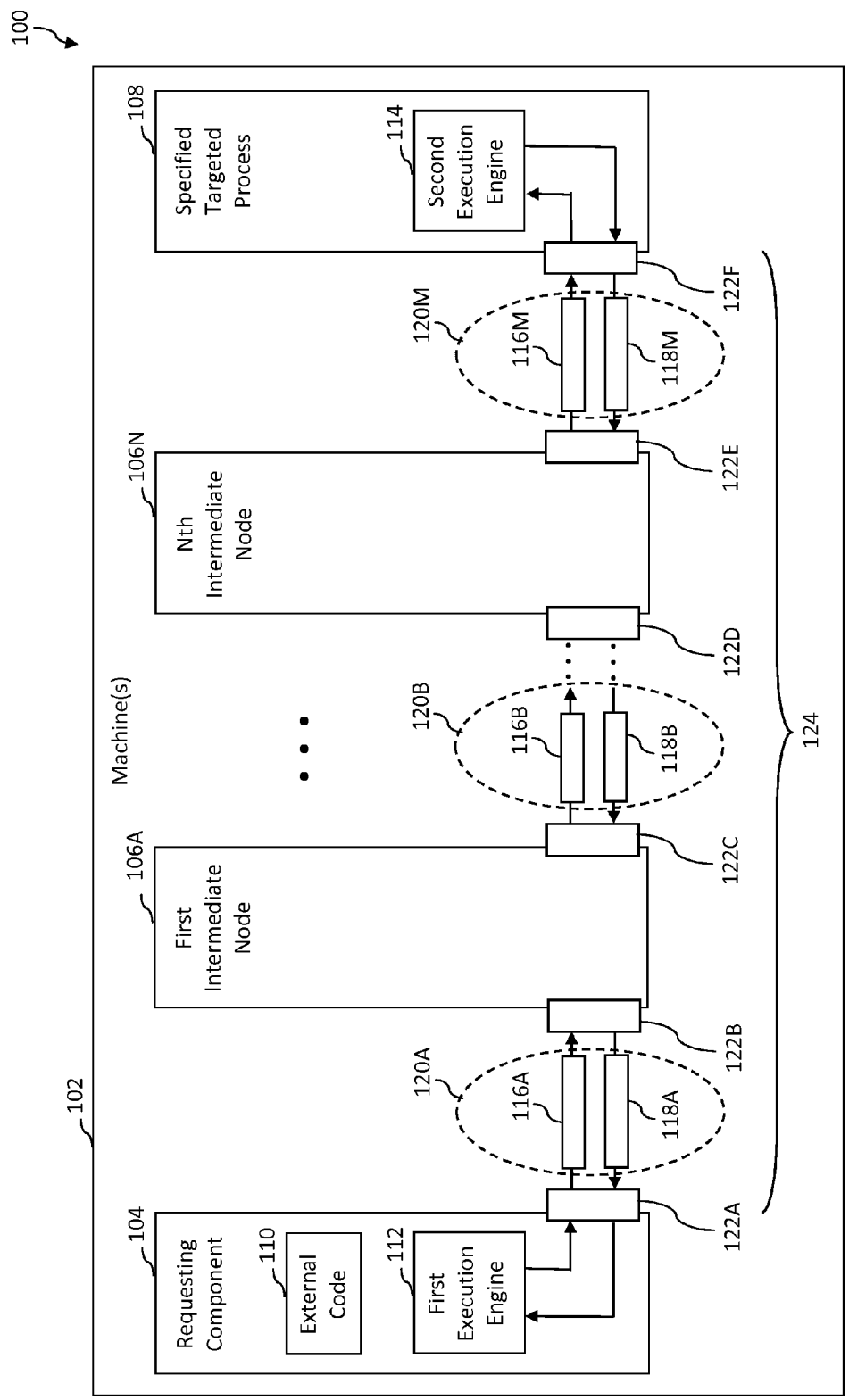

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of constructing an inter-process communication channel. For instance, the inter-process communication channel may be constructed between a requesting component and a specified targeted process. Examples of a requesting component include but are not limited to a process (e.g., an application or a service), a hosted component (e.g., a dynamic language execution engine, a component object model (COM) object, a dynamically loaded dynamic-link library (DLL), etc. A dynamic language execution engine is a component (e.g., software, hardware, firmware, or any combination thereof) that is capable of compiling, executing, and/or interpreting dynamic language code. The dynamic language execution engine may be capable of performing other operations with respect to the dynamic language code, including but not limited to accepting, parsing, etc. A dynamically loaded DLL is a component that is not directly compiled into a process; rather, the DLL is dynamically loaded into a process after start-up.

Example techniques described herein have a variety of benefits as compared to conventional techniques for constructing communication channels. For instance, the example techniques may be capable of connecting a requesting component (e.g., a tool window, such as a JavaScript®/HTML-based tool window) with a targeted process that includes a web application. For instance, the targeted process may be running on a same machine or a different machine as the requesting component. The example embodiments may enable communication across the inter-process communication channel such that the requesting component, the specified targeted process, and any intermediate node(s) therebetween, is agnostic to the actual communication medium(s) involved on the route between the requesting component and the specified targeted process.

The example embodiments may enable a JavaScript®/HTML window to be integrated into a classic desktop client application (e.g., an integrated development environment (IDE)) and/or to work across process, machine, and/or platform boundaries. For instance, the example techniques may permit remote communication with attached or networked machines. The example techniques may provide a general messaging architecture that can be utilized in arbitrary ways. For instance, the communication channel may be configured to support construction of arbitrary protocols and/or message standards. Each requesting component (e.g., tool window) may specify a respective messaging protocol, which is broken into tool-side and page-side components (e.g., script code).

The example embodiments may provide a relatively high amount of isolation from targeted processes and/or permit more efficient use of machine resources, as compared to conventional techniques. The example embodiments may provide greater performance and/or flexibility over conventional remote communication channels, such as distributed component object model (DCOM). In a DCOM implementation (where tool code consumes a reference to a remote COM object in the target environment), marshaling costs, particularly for scenarios such as querying document object model (DOM), may be prohibitively expensive. Also, such conventional channels typically entail substantial setup and/or configuration costs on a per-tool-application programming interface (API) basis.

The example embodiments may facilitate dynamic activation of tool components within running processes. The example embodiments may substantially reduce the debuggee-side costs associated with tooling web applications. Some example embodiments are capable of implementing the communication channel as native operating system (OS) code (as distinct from current hypertext transfer protocol-based (HTTP-based) solutions).

The example embodiments may support the ability to construct components that enable a remote client/client-server architecture across web code hosts (e.g., browser families/versions, etc.), hardware architectures, etc. For instance, some example embodiments may support attachment to web pages hosted in existing browsers (e.g., Internet Explorer®) and to pages hosted in the Windows JavaScript®/HTML application hosting environment. Some example embodiments may not require registration of a browser plug-in (e.g., a browser helper object (BHO)) in order to function.

The example embodiments may provide a potential facility for coalescing communications for an indeterminate number of remote targets distributed across an arbitrary number of remote environments. For instance, tool windows may be "swapped" as required in order to provide a view into a currently selected targeted process and/or to launch multiple windows of each tool window kind. Some example embodiments may be capable of showing all windows of a particular kind for multiple targets in order to, for example, compare and contrast data of the same kind for multiple targets.

The example embodiments may provide a generally secure execution environment that combines with the flexibility of authoring JavaScript®/HTML in a requesting component and/or a specified targeted process. For instance, JavaScript®/HTML may be authored safely and arbitrarily based on the security guarantees provided by the example embodiments. The example embodiments may give developers the flexibility of authoring script (e.g., JavaScript®) and HTML for a tool UI, a core communication protocol, etc. In accordance with the example embodiments, code anonymity may be preserved to mask JavaScript®/HTML from users (which may inhibit or prevent the users from modifying the JavaScript®/HTML). Accordingly, an inter-process communication channel as described herein (which may be native) may provide security, isolation, reliability guarantees, etc.

FIG. 1 is a block diagram of an example channel construction system 100 in accordance with an embodiment. Generally speaking, channel construction system 100 operates to construct an inter-process communication channel 124. In accordance with example embodiments, the inter-process communication channel 124 is constructed between a requesting component 104 and a specified targeted process 108. As shown in FIG. 1, channel construction system 100 includes one or more machines 102. Each of the machine(s) 102 is a processing system that is capable of processing information. An example of a processing system is a system that includes at least one processor that is capable of manipulating data in accordance with a set of instructions. For instance, a processing system may be desktop computer, a laptop computer, a tablet computer, a personal digital assistant, a cellular telephone, etc. Although machine(s) 102 are described herein as being processing system(s), it will be recognized that any one or more of the machine(s) 102 may be implemented as a virtual machine.

Machine(s) 102 are shown to include requesting component 104, a plurality of intermediate nodes 106A-106N, and specified targeted process 108. Each of the intermediate nodes 106A-106N and requesting component 104 may be a machine or code that is executed by a machine. Such code may be a process (e.g., an application or a service), a hosted component (e.g., a dynamic language execution engine, a component object model (COM) object, a dynamically loaded dynamic-link library (DLL), etc.

One example type of a requesting component is referred to as a tooling component. A tooling component is a requesting component that is capable of being used to perform diagnostic operations (e.g., identifying source of problem, debugging, profiling, controlling, etc.) with respect to a targeted process. Examples of a tooling component include but are not limited to a web development program (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). Accordingly, it will be recognized that the requesting component 104 may be an integrated development environment. Requesting component 104 is occasionally referred to herein as a tool window, an integrated development environment, a tool window within an IDE, etc. to illustrate various example implementations of the disclosed technology. Such references are not intended to limit the scope of the example embodiments.

One example type of a targeted process is referred to as a web application. A web application is an application that is coded in a browser-supported language and that is reliant on a common web browser to render the application executable. JavaScript® is one example type of a browser-supported language. JavaScript® may be combined with other types of languages, including but not limited to a browser-rendered markup language (e.g., hypertext markup language (HTML)), a style sheet language (e.g., cascading style sheets (CSS)) which describes presentation semantics (e.g., look, formatting, etc.) of a document written in a markup language, etc. Examples of a web browser include but are not limited to Internet Explorer®, Firefox®, Google Chrome®, Safari®, etc.

Requesting component 104 includes first execution engine 112 and external code 110. First execution engine 112 may be wrapped in a wrapper object that is hosted in requesting component 104, though the scope of the example embodiments is not limited in this respect. First execution engine 112 is configured to provide messages (e.g., instructions, information, etc.) for constructing the inter-process communication channel 124 between requesting component 104 and specified targeted process 108. For instance, such messages may include instructions for attaching requesting component 104 to specified targeted process 108, generating ports 122A-122F (or a subset thereof), storing reference(s) to any one or more of the intermediate nodes 106A-106N, requesting component 104, and/or specified targeted process 108, etc. First execution engine 112 is implemented in native operating system (OS) code. External code 110 is non-native OS code that collaborates with first execution engine 112 to facilitate construction of the inter-process communication channel 124.

Specified targeted process 108 includes second execution engine 114. Second execution engine 114 may be wrapped in a wrapper object that is hosted in specified targeted process 108, though the scope of the example embodiments is not limited in this respect. Second execution engine 114 is configured to respond to messages that are received from first execution engine 112 and to initiate its own messages for facilitating construction of the communication channel 124. For example, second execution engine 114 may provide information that is requested by first execution engine 112. In another example, second execution engine 114 may provide instructions for generating ports 122A-122F (or a subset thereof), storing reference(s) to any one or more of the intermediate nodes 106A-106N, requesting component 104, and/or specified targeted process 108, etc.

Inter-process communication channel 124 includes a plurality of ports 122A-122F. Each of ports 122A, 122C, and 122E is configured to forward messages from first execution engine 112 toward second execution engine 114. Each of ports 122B, 122D, and 122F is configured to forward messages from second execution engine 114 toward first execution engine 112. Inter-process communication channel 124 is shown to include six ports 122A-122F for illustrative purposes and is not intended to be limiting. It will be recognized that inter-process communication channel 124 may include any suitable number of ports Inter-process communication channel 124 is shown to include a plurality of links 120A-120M for illustrative purposes. It will be recognized that inter-process communication channel 124 may include any suitable number of links (e.g., one, two, etc.). Each of the links 120A-120M is configured between a respective pair of the ports 122A-122F. For instance, link 120A is configured between ports 122A and 122B; link 120B is configured between ports 122C and 122D; and link 120C is configured between ports 122E and 122F. Link 120A includes a sending communication path 116A, which is configured to transfer messages that are generated by first execution engine 112 from port 122A to port 122B. Link 120A further includes a receiving communication path 118A, which is configured to transfer messages that are generated by second execution engine 114 from port 122B to port 122A. Link 120BA includes a sending communication path 116B, which is configured to transfer messages that are generated by first execution engine 112 from port 122C to port 122D. Link 120B further includes a receiving communication path 118B, which is configured to transfer messages that are generated by second execution engine 114 from port 122D to port 122C. Link 120M includes a sending communication path 116M, which is configured to transfer messages that are generated by first execution engine 112 from port 122E to port 122F. Link 120M further includes a receiving communication path 118M, which is configured to transfer messages that are generated by second execution engine 114 from port 122F to port 122E. Each of the sending communication paths 116A-116M and the receiving communication paths 118A-118M may be an anonymous pipe, though the scope of the example embodiments is not limited in this respect. For instance, such anonymous pipes may be provided by a local machine operating system for inter-process communications and/or Transmission Control Protocol and Internet Protocol (TCP/IP) network traffic.

Each of ports 122A, 122C, and 122E is configured to serialize messages that are generated by first execution engine 112 for transfer to a next consecutive node along the inter-process communication channel 124 toward second execution engine 114. Each of ports 122B, 122D, and 122F is configured to de-serialize such messages upon receipt. For instance, port 122A is configured to serialize messages that are generated by first execution engine 112 for transfer to first intermediate node 106A via sending communication path 116A, and port 122B is configured to de-serialize such message upon receipt at first intermediate node 106A. Port 122C is configured to serialize such messages for transfer from first intermediate node 106A to Nth intermediate node 106N via sending communication path 116C, and port 122D is configured to de-serialize such messages upon receipt at Nth intermediate node 106N. Port 122E is configured to serialize such messages for transfer from Nth intermediate node 106N to specified targeted process 108 via sending communication path 116M, and port 122F is configured to de-serialize such messages upon receipt at specified targeted process 108.

Each of ports 122B, 122D, and 122F is further configured to serialize messages that are generated by second execution engine 114 for transfer to a next consecutive node along the inter-process communication channel 124 toward first execution engine 112. Each of ports 122A, 122C, and 122E is further configured to de-serialize such messages upon receipt. For instance, port 122F is configured to serialize messages that are generated by second execution engine 114 for transfer to Nth intermediate node 106N via receiving communication path 118M, and port 122E is configured to de-serialize such message upon receipt at Nth intermediate node 106N. Port 122D is configured to serialize such messages for transfer from Nth intermediate node 106N to first intermediate node 106A via receiving communication path 118B, and port 122C is configured to de-serialize such messages upon receipt at first intermediate node 106A. Port 122B is configured to serialize such messages for transfer from first intermediate node 106A to requesting component 104 via receiving communication path 118A, and port 122A is configured to de-serialize such messages upon receipt at requesting component 104.

Messages that are generated by first execution engine 112 or second execution engine 114 may include JavaScript® objects, for example. Each JavaScript® object may include one or more sub-elements, such as JavaScript® strings. Processing of JavaScript® objects by ports 122A-122F will be discussed with respect to a one-way communication from port 122A to port 122B for illustrative purposes and is not intended to be limiting. For instance, port 122A may call a function into first execution engine 112 that serializes JavaScript® objects into a low-level format, such as bytes. Port 122A may transfer the bytes to port 122B via sending communication path 116A. Port 122B includes information that indicates a manner in which the JavaScript® objects were constructed before being serialized by port 122A. Port 122B may use an event that calls into first execution engine 112 with an indicator (e.g., a string). The indicator may specify an appropriate event handler to be invoked for port 122B.

Each of first execution engine 112 and second execution engine 114 may be a dynamic language execution engine (e.g., a JavaScript® engine), though the scope of the example embodiments is not limited in this respect. The intermediate nodes 106A-106N are shown in FIG. 1 for illustrative purposes and are not intended to be limiting. It will be recognized that channel construction system 100 may include any number of intermediate nodes. For instance, channel construction system 100 may include a single intermediate node or no intermediate nodes at all.

In one example implementation, requesting component 104 and specified targeted process 108 are executed by a common, single machine. In another example implementation, requesting component 104 is executed by a first machine, and specified targeted process 108 is executed by a second machine that is different from the first machine. In accordance with this example implementation, the first and second machines are separated by a machine boundary. In further accordance with this example implementation, communication between the first and second machines may be carried out over a network using well-known network communication protocols. For instance, the network may be a wide-area network (e.g., the Internet), a local area network (LAN), another type of network, or a combination thereof.

Once the inter-process communication channel 124 is constructed, requesting component 104 may perform operations with respect to specified targeted process 108. For example, these operations may include diagnostic operations, such as identifying source of problem, debugging, profiling, controlling, etc. Accordingly, first execution engine 112 may provide requests to second execution engine 114 for accessing (e.g., tooling) specified targeted process 108. Such requests may specify information to be retrieved regarding specified targeted process 108, actions to be performed with regard to specified targeted process 108, etc.

Second execution engine 114 may have an execution context that is different from an execution context of specified targeted process 108. For instance, having different execution contexts for second execution engine 114 and specified targeted process 108 may hinder or prevent execution of second execution engine 114 from interfering with execution of specified targeted process 108. Second execution engine 114 may use privileged interfaces (e.g., privileged APIs) to interact with specified targeted process 108 (e.g., to inspect and/or modify a state of specified targeted process 108). Second execution engine 114 may use such interfaces to access underlying windows APIs for networking, file access, user data, etc. Accordingly, tooling functionality, which otherwise may be implemented using merely lower-level system APIs, may be constructed in a dynamic language (e.g., JavaScript®).

Figure 2:
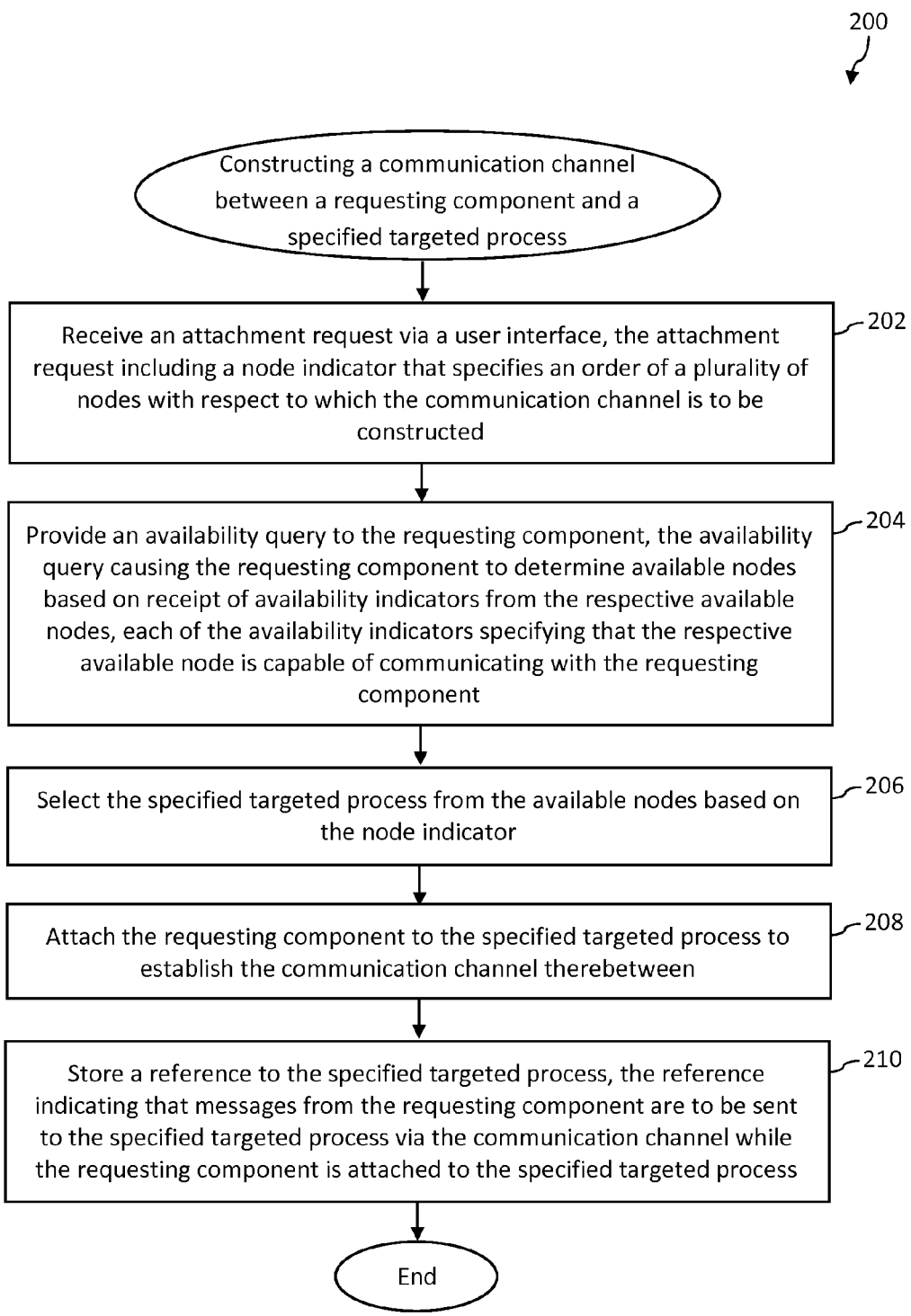
Figure 3:
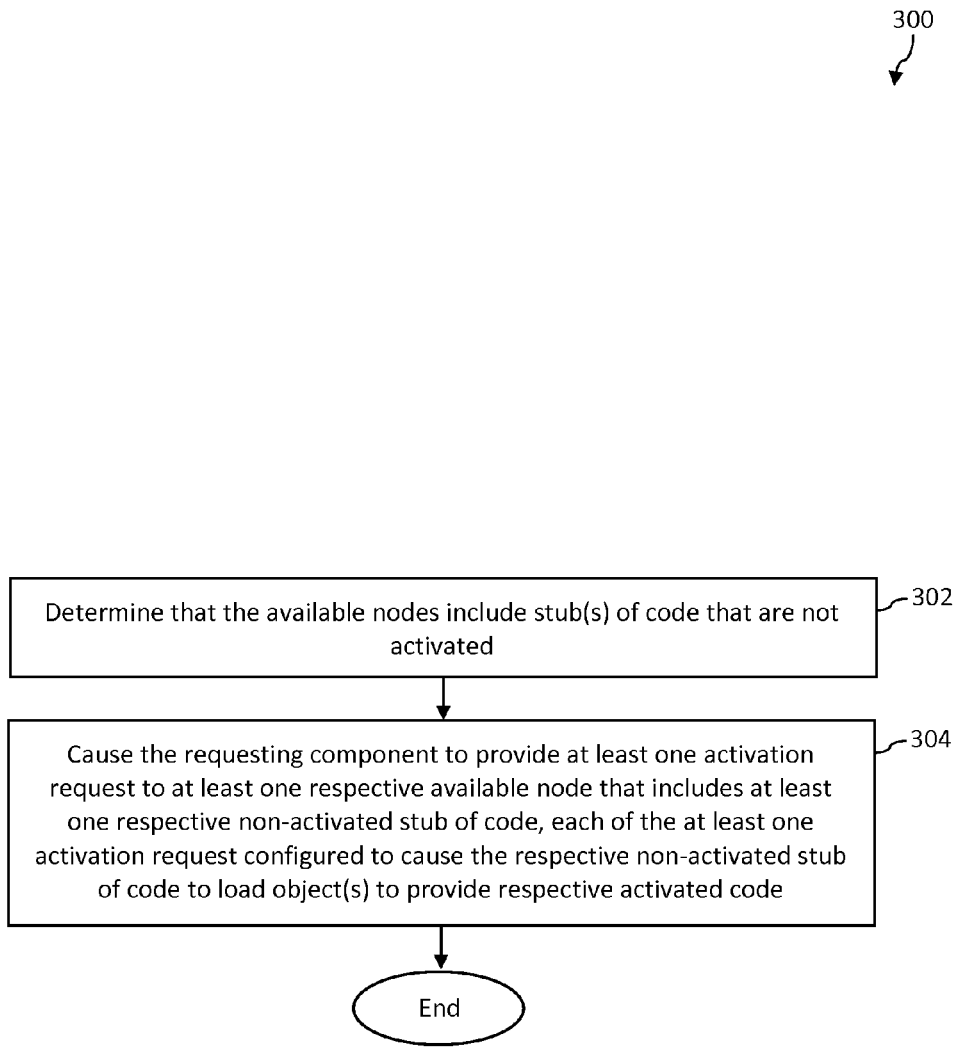
Figure 4:
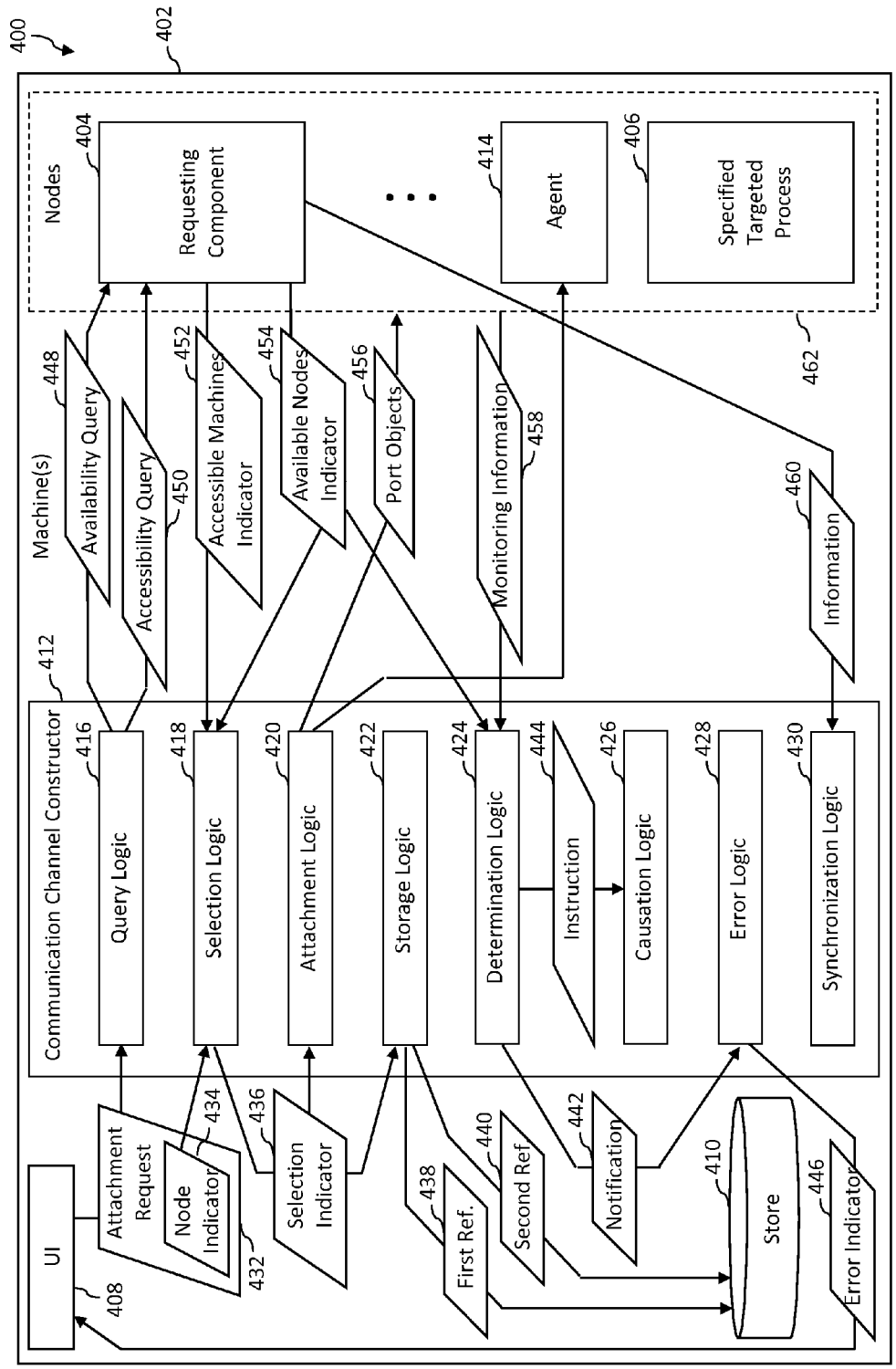
FIGS. 4 and 6 are block diagrams of example implementations of a channel construction system shown in FIG. 1 in accordance with embodiments.

FIGS. 2 and 3 depict flowcharts 200 and 300 of example methods for constructing a communication channel between a requesting component and a specified targeted process according to embodiments. Flowcharts 200 and 300 may be performed by channel construction system 100 shown in FIG. 1, for example. For illustrative purposes, flowcharts 200 and 300 are described with respect to channel construction system 400 shown in FIG. 4, which is an example of channel construction system 100, according to an embodiment. As shown in FIG. 4, channel construction system 400 includes one or more machines 402. Machine(s) 402 include a user interface (UI) 408, a store 410, a communication channel constructor 412, and nodes 462. Communication channel constructor 412 includes query logic 416, selection logic 418, attachment logic 420, storage logic 422, determination logic 424, causation logic 426, error logic 428, and synchronization logic 430. Nodes 462 include requesting component 404, agent 414, and specified targeted process 406. Further structural and operational embodiments will be apparent to persons skilled in the relevant art(s) based on the discussion regarding flowcharts 200 and 300.

As shown in FIG. 2, the method of flowchart 200 begins at step 202. In step 202, an attachment request is received via a user interface. The attachment request indicates that the requesting component is to be attached to the specified targeted process. The attachment request includes a node indicator that specifies an order of a plurality of nodes with respect to which the communication channel is to be constructed. The requesting component is an originating node of the plurality of nodes. An originating node is a first successive node in the order of the plurality of nodes. The specified targeted process is a destination node of the plurality of nodes. A destination node is a last successive node in the order of the plurality of nodes. The requesting component is external to the specified targeted process. In one example embodiment, the requesting component is an integrated development environment, and the specified targeted process is a running web application that a user wishes to inspect and manipulate for diagnostic purposes. In an example implementation, query logic 416 receives an attachment request 432 via user interface 408. The attachment request 432 indicates that requesting component 404 is to be attached to specified targeted process 406. The attachment request 432 includes a node indicator 434 that specifies an order of nodes 462.

At step 204, an availability query is provided to the requesting component. The availability query causes the requesting component to determine available nodes based on receipt of availability indicators from the respective available nodes. Each of the availability indicators specifies that the respective available node is capable of communicating with the requesting component. In an example implementation, query logic 416 provides an availability query 448 to requesting component 404. The availability query 448 causes requesting component 404 to determine the available nodes. Requesting component 404 generates an available nodes indicator 454, which specifies the available nodes.

At step 206, the specified targeted process is selected from the available nodes based on the node indicator. In an example implementation, selection logic 418 selects specified targeted process 406 from the available nodes based on node indicator 434. In accordance with this implementation, selection logic 418 may generate a selection indicator 436 to specify that specified targeted process 406 is selected.

At step 208, the requesting component is attached to the specified targeted process to establish the communication channel therebetween. In an example implementation, attachment logic 420 attaches requesting component 404 to specified targeted process 406 to establish the communication channel therebetween. In accordance with this implementation, attachment logic 420 may attach requesting component 404 to specified targeted process 406 based on selection indicator 436 specifying that specified targeted process 406 is selected.

In an example embodiment, step 208 includes automatically generating a first port object that is associated with the requesting component. The first port object is configured to serialize messages that are provided from the requesting component to the specified targeted process. In accordance with this embodiment, step 208 further includes automatically generating a second port object that is associated with the specified targeted process. The second port object is configured to de-serialize messages that are received at the specified targeted process from the requesting component. In further accordance with this embodiment, the first port object may be further configured to de-serialize messages that are received at the requesting component from the specified targeted process, and the second port object may be further configured to serialize messages that are provided from the specified targeted process to the requesting component. In an example implementation, attachment logic 420 automatically generates port objects 456, which include the first port object associated with requesting component 404 and the second port object associated with specified targeted process 406.

In an aspect of this embodiment, a second reference to the requesting component may be stored. The second reference indicates that messages from the specified targeted process are to be sent to the requesting component while the requesting component is attached to the specified targeted process. In an example implementation, storage logic 422 stores a second reference 440 in store 410. The second reference 440 indicates that messages from specified targeted process 406 are to be sent to requesting component 404 while requesting component 404 is attached to specified targeted process 406.

In another aspect of this embodiment, a determination is made that a designated port object is disabled. The designated port object is the first port object or the second port object. In accordance with this aspect, the first port object or the second port object that is not the designated port object is caused to be disabled in response to the determination that the designated port object is disabled. In an example implementation, determination logic 424 determines that the designated port object is disabled. For example, determination logic 424 may receive monitoring information 458 from nodes 462. In accordance with this example, monitoring information 458 may indicate that one or more of the port objects 456 are disabled. In further accordance with this example, determination logic 424 may determine that the designated port object is disabled based on the monitoring information 458 indicating that the designated port object is disabled. In accordance with this implementation, determination logic 424 may generate an instruction 444, which instructs causation logic 426 to cause the first port object or the second port object that is not the designated port object to be disabled. In accordance with this implementation, causation logic 426 causes the first port object or the second port object that is not the designated port object to be disabled. For instance, causation logic 426 may cause the first port object or the second port object that is not the designated port object to be disabled in response to (e.g., based on) receipt of the instruction 444.

In yet another aspect of this embodiment, a determination may be made that an error occurs with regard to the communication channel. In accordance with this aspect, attempts to cause communication between the first port object and the second port object via the communication channel are halted in response to the determination that the error occurs with regard to the communication channel. In further accordance with this aspect, an error indicator is provided via the user interface to indicate that the error occurs with regard to the communication channel.

In an example implementation, determination logic 424 determines that the error occurs with regard to the communication channel. For example, determination logic 424 may receive monitoring information 458 from nodes 462. In accordance with this example, monitoring information 458 may indicate that the error occurs with regard to the communication channel. In further accordance with this example, determination logic 424 may determine that the error occurs based on the monitoring information 458 indicating that the error occurs. Determination logic 424 may generate an instruction 444, which instructs causation logic 426 to halt attempts to cause communication between the first port object and the second port object via the communication channel. In accordance with this implementation, causation logic 426 halts attempts to cause communication between the first port object and the second port object via the communication channel. For instance, causation logic 426 may halt attempts to cause communication between the first port object and the second port object via the communication channel in response to (e.g., based on) receipt of the instruction 444. Determination logic 424 may generate a notification 442 to specify that the error occurs with regard to the communication channel. In accordance with this implementation, error logic 428 provides an error indicator 446 via user interface 408 to indicate that the error occurs with regard to the communication channel. For instance, error logic 428 may provide the error indicator 446 in response to receipt of the notification 442.

At step 210, a reference to the specified targeted process is stored. The reference indicates that messages from the requesting component are to be sent to the specified targeted process via the communication channel while the requesting component is attached to the specified targeted process. In an example implementation, storage logic 422 stores a first reference 438 in store 410. The first reference 438 indicates that messages from requesting component 404 are to be sent to specified targeted process 406 while requesting component 404 is attached to specified targeted process 406. For instance, storage logic 422 may store the first reference 438 based on selection indicator 436 specifying that specified targeted process 406 is selected.

In some example embodiments, the available nodes that are described above with respect to step 204 include one or more processes executing on a first machine on which the requesting component executes (e.g., on a developer machine) and further include one or more other machines that are accessible to the first machine. It will be recognized that any of these one or more processes, any of the other machine(s), and/or any process(es) executing on any of the other machine(s) may be selected before the specified targeted process is selected at step 206.

For example, if a second machine is selected from the available nodes, the requesting component may determine second available nodes based on receipt of second availability indicators from the respective second available nodes. In accordance with this example, each of the second availability indicators specifies that the respective second available node is capable of communicating with the requesting component. In further accordance with this example, the second available nodes include one or more second processes executing on the second machine and further include one or more other machines that are accessible to the second machine. It will be recognized that any of the second process(es), any of the other machine(s), and/or any process(es) executing on any of the other machine(s) may be selected before the specified targeted process is selected at step 206.

In accordance with the example above, if a third machine is selected from the second available nodes, the requesting component may determine third available nodes based on receipt of third availability indicators from the respective third available nodes. In accordance with this example, each of the third availability indicators specifies that the respective third available node is capable of communicating with the requesting component. In further accordance with this example, the third available nodes include one or more third processes executing on the third machine and further include one or more other machines that are accessible to the third machine. It will be recognized that any of the third process(es), any of the other machine(s), and/or any process(es) executing on any of the other machine(s) may be selected before the specified targeted process is selected at step 206.

Accordingly, it can be seen that any number of hops can be performed before the specified targeted process is reached. Such hops may be between processes on a specified machine, between machines, between a process and a machine, etc. Moreover, each hop may be performed in response to a respective instruction that is received via the user interface. For example, the user interface may display identifiers associated with nodes that are available to a first machine of a user to indicate that the first machine, which executes the requesting component, is capable of accessing designated processes that run on the first machine and to further indicate that the first machine is capable of accessing second, third, and fourth machines via a computer network. In accordance with this example, the user interface may receive a first selection instruction from the user that selects the second machine from the available nodes. The user interface may then display identifiers associated with nodes that are available to the first machine to indicate that the second machine is capable of accessing second designated processes that run on the second machine and to further indicate that the second machine is capable of accessing the first, third, and fourth machines via the computer network. In further accordance with this example, the user interface may receive a second selection instruction from the user that selects the specified targeted process from the second designated processes. It will be recognized that these examples are provided for illustrative purposes and are not intended to be limiting. Further example embodiments are described below.

In an example embodiment, the requesting component executes on a first machine, and the specified targeted process executes on a second machine that is different from the first machine. In accordance with this embodiment, an accessibility query is provided to the requesting component. The accessibility query causes the requesting component to determine one or more accessible machines in a networked computer system that are accessible to the first machine in accordance with a computer networking protocol. The one or more accessible machines include the second machine. In further accordance with this embodiment, the second machine is selected from the one or more accessible machines based on a selection instruction that is received in response to a determination of the one or more accessible machines. In further accordance with this embodiment, step 208 includes causing an agent to execute on the second machine. For instance, the agent may be included in the plurality of nodes. The agent is configured to facilitate the construction of the communication channel between the requesting component and the specified targeted process.

In an example implementation, requesting component 404 executes on the first machine, and specified targeted process 406 executes on the second machine. In accordance with this implementation, the first machine and the second machine are included in machine(s) 402. In further accordance with this implementation, query logic 416 provides an accessibility query 450 to requesting component 404. The accessibility query 450 causes requesting component 404 to determine the one or more accessible machines that are accessible to the first machine in accordance with the computer networking protocol. The one or more accessible machines include the second machine. Requesting component 404 may generate an accessible machines indicator 452, which specifies the one or more accessible machines. In further accordance with this implementation, selection logic 418 selects the second machine from the one or more accessible machines based on the accessible machines indicator 452 and the node indicator 454. For instance, the selection instruction may include the accessible machines indicator 452 and the node indicator 454. In further accordance with this implementation, attachment logic 420 causes agent 414 to execute on the second machine. Agent 414 is configured to facilitate the construction of the communication channel between requesting component 404 and specified targeted process 406.

In accordance with this embodiment, step 208 may include automatically generating a first port object that is associated with the requesting component, a second port object that is associated with the agent, a third port object that is associated with the agent, and a fourth port object that is associated with the specified targeted process. The first port object is configured to serialize messages that are provided from the requesting component toward the agent. The second port object is configured to de-serialize messages that are received at the agent from the requesting component. The third port object is configured to serialize messages that are provided from the agent toward the specified targeted process. The fourth port object is configured to de-serialize messages that are received at the specified targeted process from the agent. In an example implementation, attachment logic 420 automatically generates the first port object associated with requesting component 404, the second port object associated with agent 414, the third port object associated with agent 414, and the fourth port object associated with specified targeted process 406.

In an aspect of this embodiment, the first port object may be further configured to de-serialize messages that are received at the requesting component from the agent. The second port object may be further configured to serialize messages that are provided from the agent toward the requesting component. The third port object may be further configured to de-serialize messages that are received at the agent from the specified targeted process. The fourth port object may be further configured to serialize messages that are provided form the specified targeted process toward the agent. In accordance with this aspect, a second reference to the requesting component may be stored. The second reference indicates that messages from the specified targeted process are to be sent to the requesting component while the requesting component is attached to the specified targeted process.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, flowchart 200 includes receiving information regarding the specified targeted process asynchronously at the requesting component via the communication channel. In accordance with this embodiment, flowchart 200 further includes synchronizing a state of a tooling window of the requesting component with a state of the specified targeted process based on the information. In further accordance with this embodiment, the tooling window is configured to enable diagnostic operations to be performed with respect to the specified targeted process.

In an example implementation, requesting component 404 receives information 460 regarding the specified targeted process asynchronously. In accordance with this implementation, synchronization logic 430 synchronizes a state of a tooling window of requesting component 404 with a state of specified targeted process 406 based on the information 460. For instance, requesting component 404 may provide the information 460 to synchronization logic 430. In further accordance with this implementation, the tooling window of requesting component 404 is configured to enable diagnostic operations to be performed with respect to specified targeted process 406.

In another example embodiment, flowchart 200 includes causing a dynamic language execution engine in a wrapper object, which is hosted in the specified targeted process, to be activated in response to attaching the requesting component to the specified targeted process. In an example implementation, causation logic 426 causes a dynamic language execution engine in a wrapper object hosted in specified targeted process 406 to be activated in response requesting component 404 being attached to specified targeted process 406.

In yet another example embodiment, flowchart 200 includes the steps of flowchart 300 shown in FIG. 3. As shown in FIG. 3, the method of flowchart 300 begins at step 302. In step 302, a determination is made that the available nodes include stub(s) of code that are not activated. In an example implementation, determination logic 424 determines that the available nodes include the stub(s) of code that are not activated. In accordance with this implementation, determination logic 424 may generate instruction 444 to specify that the available nodes include the stub(s) of code that are not activated.

At step 304, the requesting component is caused to provide at least one activation request to at least one respective available node that includes at least one respective non-activated stub of code. For example, each available node that includes a respective non-activated stub of code may not include running code that is capable of responding to the respective activation request, though each non-activated stub of code may be capable of instantiating objects that are received from the requesting component. Each of the at least one activation request is configured to cause the respective non-activated stub of code to load object(s) to provide respective activated code. In an example implementation, causation logic 426 causes requesting component 404 to provide the at least one activation request to the at least one respective available node that includes the at least one respective non-activated stub of code. For instance, causation logic 426 may cause requesting component 404 to provide the at least one activation request in response to (e.g., based on) receipt of the instruction 444.

In some example embodiments, one or more steps 302 and/or 304 of flowchart 300 may not be performed. Moreover, steps in addition to or in lieu of steps 302 and/or 304 may be performed.

It will be recognized that channel construction system 400 may not include one or more of nodes 462, requesting component 404, specified targeted process 406, user interface 408, store 410, communication channel constructor 412, agent 414, query logic 416, selection logic 418, attachment logic 420, storage logic 422, determination logic 424, causation logic 426, error logic 428, and/or synchronization logic 430. Furthermore, channel construction system 400 may include components in addition to or in lieu of nodes 462, requesting component 404, specified targeted process 406, user interface 408, store 410, communication channel constructor 412, agent 414, query logic 416, selection logic 418, attachment logic 420, storage logic 422, determination logic 424, causation logic 426, error logic 428, and/or synchronization logic 430.

Figure 5:
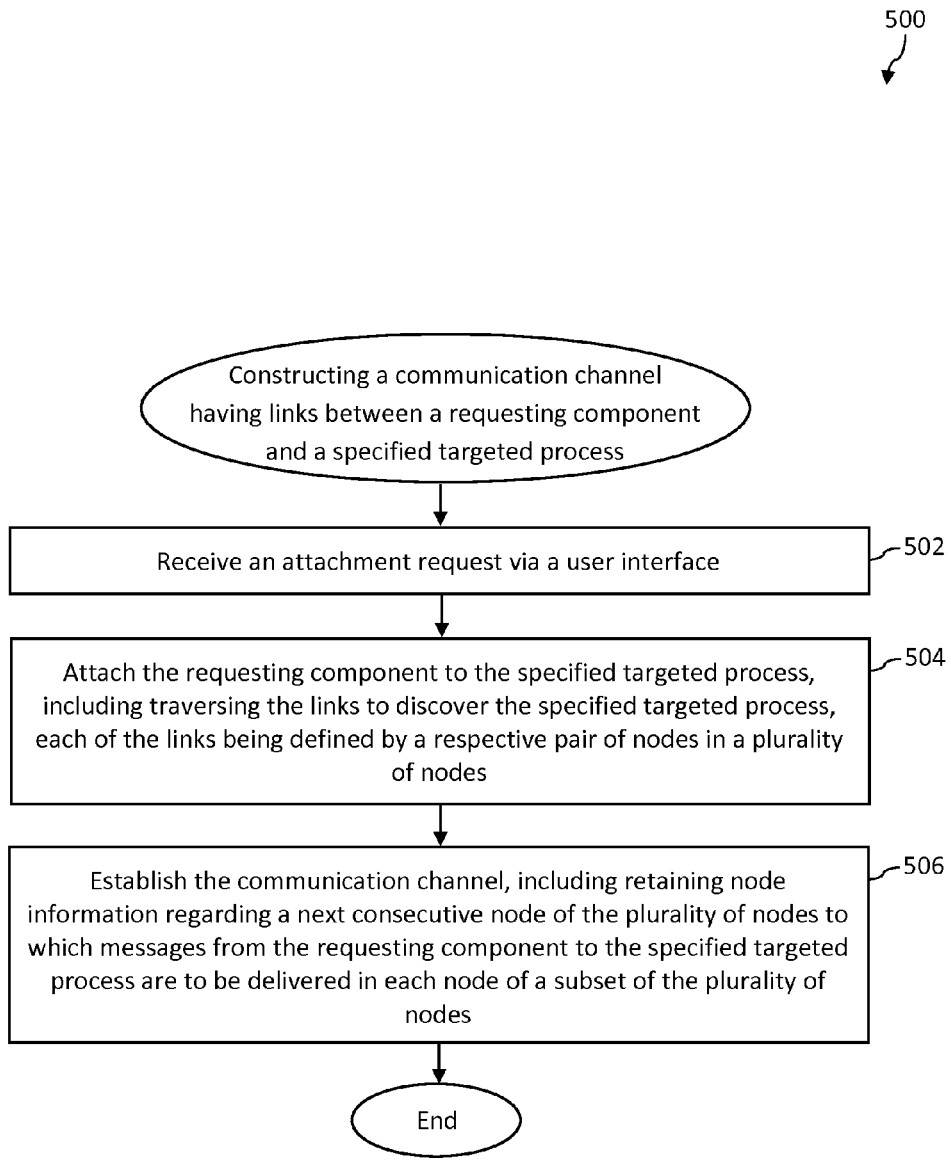
Figure 6:
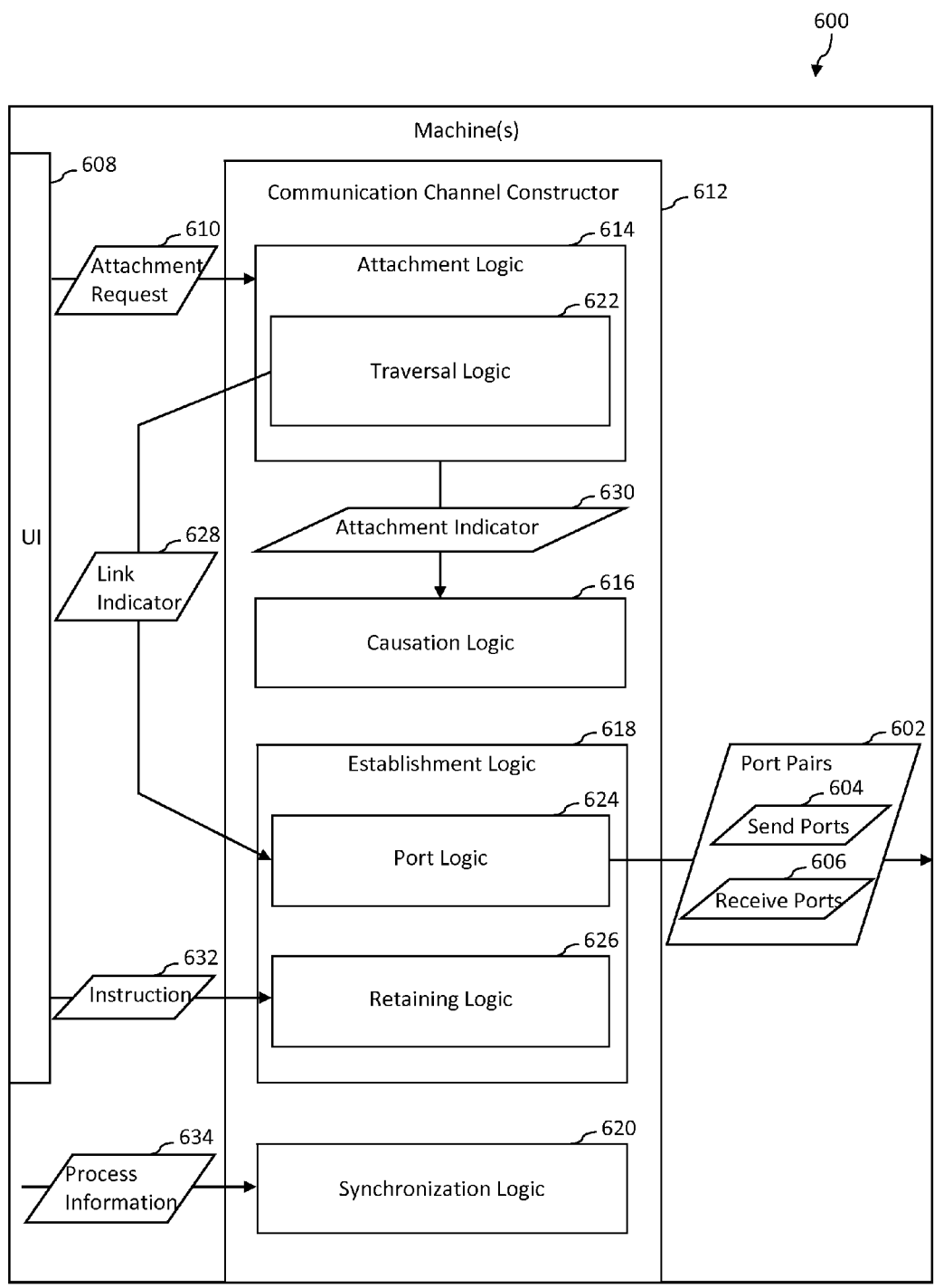

FIG. 5 depicts a flowchart 500 of an example method for constructing a communication channel having links between a requesting component and a specified targeted process according to an embodiment. Flowchart 500 may be performed by machine(s) 102 of channel construction system 100 shown in FIG. 1, for example. For illustrative purposes, flowchart 500 is described with respect to machine(s) 600 shown in FIG. 6, which is an example of machine(s) 102, according to an embodiment. As shown in FIG. 6, machine(s) 600 include a user interface (UI) 608 and a communication channel constructor 612. Communication channel constructor 612 includes attachment logic 614, causation logic 616, establishment logic 618, and synchronization logic 620. Attachment logic 614 includes traversal logic 622. Establishment logic 618 includes port logic 624 and retaining logic 626. Further structural and operational embodiments will be apparent to persons skilled in the relevant art(s) based on the discussion regarding flowchart 500.

As shown in FIG. 5, the method of flowchart 500 begins at step 502. In step 502, an attachment request is received via a user interface. The attachment request indicates that the requesting component is to be attached to the specified targeted process. The requesting component is external to the specified targeted process. In an example implementation, attachment logic 614 receives an attachment request 610 via user interface 608.

At step 504, the requesting component is attached to the specified targeted process. Attaching the requesting component to the specified targeted process includes traversing the links to discover the specified targeted process. Each of the links is defined by a respective pair of nodes in a plurality of nodes. The requesting component is an originating node of the plurality of nodes. The specified targeted process is a destination node of the plurality of nodes. The plurality of nodes includes one or more intermediate nodes between the requesting component and the specified targeted process. In an example implementation, attachment logic 614 attaches the requesting component to the specified targeted process. In accordance with this implementation, traversal logic 622, which is included in attachment logic 614, traverses the links to discover the specified targeted process. In further accordance with this implementation, attachment logic 614 may generate an attachment indicator 630, which specifies that the requesting component is attached to the specified targeted process. In further accordance with this implementation, attachment logic 614 may generate a link indicator 628, which specifies the links. For instance, the link indicator 628 may specify the pairs of nodes that define the respective links.

In an example embodiment, each of the one or more intermediate nodes is an arbitrary node that is configured to discover processes at the respective arbitrary node and processes at others of the plurality of nodes that are accessible from the respective arbitrary node.

At step 506, the communication channel is established. Establishing the communication channel includes retaining node information regarding a next consecutive node of the plurality of nodes to which messages from the requesting component to the specified targeted process are to be delivered in each node of a subset of the plurality of nodes. The subset includes the requesting components and the one or more intermediate nodes. In an example implementation, establishment logic 618 establishes the communication channel. Retaining logic 626, which is included in establishment logic 618, retains node information regarding a next consecutive node of the plurality of nodes to which messages from the requesting component to the specified targeted process are to be delivered in each node of the subset.

In an example embodiment, establishing the communication channel further includes, in each node of a second subset of the plurality of nodes, retaining second node information regarding a next consecutive node of the plurality of nodes to which messages from the specified targeted process to the requesting component are to be delivered. The second subset includes the specified targeted process and the one or more intermediate nodes. In an example implementation, retaining logic 626 retains, in each node of the second subset, second node information regarding a next consecutive node of the plurality of nodes to which messages from the specified targeted process to the requesting component are to be delivered.

In another example embodiment, establishing the communication channel further includes automatically generating a first pair of communication ports for each of the links. Each first pair of communication ports includes a respective send port and a respective receive port. Each respective send port is configured to send messages that are from the requesting component toward the specified targeted process. Each respective receive port is configured to receive message from the send port in the respective first pair. In an example implementation, port logic 624, which is included in establishment logic 618, automatically generates port pairs 602, which include send ports 604 and receive ports 606. Port pairs 602 include the first pair of communication ports for each of the links. For instance, each first pair may include a respective one of the second ports 604 and a respective one of the receive ports 606. In accordance with this implementation, port logic 624 may automatically generate the port pairs 602 in response to (e.g., based on) receipt of link indicator 628.

In an aspect of this embodiment, establishing the communication channel further includes automatically generating a second pair of communication ports for each of the links. Each second pair of communication ports includes a respective send port and a respective receive port. Each respective send port is configured to send messages that are from the specified targeted process toward the requesting component. Each respective receive port is configured to receive message from the send port in the respective second pair. In an example implementation, the port pairs 602, which are automatically generated by port logic 624, include the second pair of communication ports for each of the links. For instance, each second pair may include a respective one of the second ports 604 and a respective one of the receive ports 606.

In some example embodiments, one or more steps 502, 504, and/or 506 of flowchart 500 may not be performed. Moreover, steps in addition to or in lieu of steps 502, 504, and/or 506 may be performed. For instance, in an example embodiment, flowchart 500 includes, for at least one node of the subset (e.g., for each node of the subset), specifying the respective next consecutive node of the plurality of nodes to which messages from the requesting component to the specified targeted process are to be delivered based on an instruction received via the user interface. In an example implementation, for at least one node of the subset, retaining logic 626 specifies the respective next consecutive node of the plurality of nodes to which messages from the requesting component to the specified targeted process are to be delivered based on an instruction 632 received via user interface 608.

In another example embodiment, flowchart 500 includes receiving process information regarding the specified targeted process asynchronously at the requesting component via the communication channel. In accordance with this embodiment, flowchart 500 further includes synchronizing a state of a tooling window of the requesting component with a state of the specified targeted process based on the process information. In further accordance with this embodiment, the tooling window is configured to enable diagnostic operations to be performed with respect to the specified targeted process. In an example implementation, synchronization logic 620 synchronizes a state of a tooling window of the requesting component with a state of the specified targeted process based on process information 634 regarding the specified targeted process. For instance, the requesting component may forward the processing information 634 to synchronization logic 620 in response to receiving the processing information 634 asynchronously via the communication channel.

In yet another example embodiment, flowchart 500 includes causing a dynamic language execution engine in a wrapper object, which is hosted in the specified targeted process, to be activated in response to attaching the requesting component to the specified targeted process at step 504. In an example implementation, causation logic 616 causes the dynamic language execution engine in the wrapper object to be activated in response to the requesting component being attached to the specified targeted process. For instance, causation logic 616 may cause the dynamic language execution engine in the wrapper object to be activated in response to (e.g., based on) receipt of attachment indicator 630.

It will be recognized that machine(s) 600 may not include one or more of user interface 608, communication channel constructor 612, attachment logic 614, causation logic 616, establishment logic 618, synchronization logic 620, traversal logic 622, port logic 624, and/or retaining logic 626. Furthermore, machine(s) 600 may include components in addition to or in lieu of user interface 608, communication channel constructor 612, attachment logic 614, causation logic 616, establishment logic 618, synchronization logic 620, traversal logic 622, port logic 624, and/or retaining logic 626.

Any one or more of machine(s) 102, requesting component 104, any one or more of intermediate nodes 106A-106N, specified targeted process 108, first execution engine 112, second execution engine 114, any one or more of machine(s) 402, requesting component 404, specified targeted process 406, user interface 408, communication channel constructor 412, agent 414, query logic 416, selection logic 418, attachment logic 420, storage logic 422, determination logic 424, causation logic 426, error logic 428, synchronization logic 430, nodes 462, user interface 608, communication channel constructor 612, attachment logic 614, causation logic 616, establishment logic 618, synchronization logic 620, traversal logic 622, port logic 624, retaining logic 626, flowchart 200, flowchart 300, and/or flowchart 500 may be implemented in hardware, software, firmware, or any combination thereof.

For example, any one or more of machine(s) 102, requesting component 104, any one or more of intermediate nodes 106A-106N, specified targeted process 108, first execution engine 112, second execution engine 114, any one or more of machine(s) 402, requesting component 404, specified targeted process 406, user interface 408, communication channel constructor 412, agent 414, query logic 416, selection logic 418, attachment logic 420, storage logic 422, determination logic 424, causation logic 426, error logic 428, synchronization logic 430, nodes 462, user interface 608, communication channel constructor 612, attachment logic 614, causation logic 616, establishment logic 618, synchronization logic 620, traversal logic 622, port logic 624, retaining logic 626, flowchart 200, flowchart 300, and/or flowchart 500 may be implemented as computer program code configured to be executed in one or more processors.

In another example, any one or more of machine(s) 102, requesting component 104, any one or more of intermediate nodes 106A-106N, specified targeted process 108, first execution engine 112, second execution engine 114, any one or more of machine(s) 402, requesting component 404, specified targeted process 406, user interface 408, communication channel constructor 412, agent 414, query logic 416, selection logic 418, attachment logic 420, storage logic 422, determination logic 424, causation logic 426, error logic 428, synchronization logic 430, nodes 462, user interface 608, communication channel constructor 612, attachment logic 614, causation logic 616, establishment logic 618, synchronization logic 620, traversal logic 622, port logic 624, retaining logic 626, flowchart 200, flowchart 300, and/or flowchart 500 may be implemented as hardware logic/electrical circuitry.

For instance, in an embodiment, one or more of machine(s) 102, requesting component 104, one or more of intermediate nodes 106A-106N, specified targeted process 108, first execution engine 112, second execution engine 114, one or more of machine(s) 402, requesting component 404, specified targeted process 406, user interface 408, communication channel constructor 412, agent 414, query logic 416, selection logic 418, attachment logic 420, storage logic 422, determination logic 424, causation logic 426, error logic 428, synchronization logic 430, nodes 462, user interface 608, communication channel constructor 612, attachment logic 614, causation logic 616, establishment logic 618, synchronization logic 620, traversal logic 622, port logic 624, retaining logic 626, flowchart 200, flowchart 300, and/or flowchart 500 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Messaging Interface

Example embodiments are capable of utilizing a messaging interface for sending and/or receiving messages in accordance with the techniques described herein. For instance, the messaging interface may include a variety of methods for sending and receiving messages. Following is a code snippet that illustrates an example implementation of the messaging interface:

```
interface IMessageReceiver {
    void OnConnect(string portName);
    void OnMessage(string portName, string messageData);
    void OnDetach( );
    void ExecuteScript(string code);
}
```

This example implementation of the messaging interface is shown to include four methods: OnConnect, OnMessage, OnDetach, and ExecuteScript. These methods are capable of supporting a JavaScript® application programming interface (API) similar to the HTML 5 post message API for consumption by the requesting component, the specified targeted process, and any intermediate node(s) therebetween.

IV. Discovery and Selection Interface

Example embodiments are capable of utilizing a discovery and selection interface for enumerating available next hops from a node (i.e., available nodes that are capable of communicating with the node) and selecting a target for further communications in accordance with the techniques described herein. Following is a snippet of pseudo code that illustrates an example implementation of the discovery and selection interface:

```
interface ISelectionAndDiscovery {
    list GetAvailableHops( );
    list GetAvailableTargetEndpoints( );
    IMessageReceiver SelectTargetEndpoint(IMessageReceiver forwardResponsesTo, Endpoint target);
    ISelectionAndDiscovery SelectTargetHop(Hop target);
}
```

For instance, any of ports 122A-122F shown in FIG. 1, port objects 456 shown in FIG. 4, port pairs 602 (including sending ports 604 and receiving ports 606) may serialize outgoing calls to IMessageReceiver and ISelectionAndDiscovery onto a communications medium (e.g., a respective link 120A-120M shown in FIG. 1) and de-serialize incoming calls and results coming in from the medium. Referring back to FIG. 1, a single port is attached to the node on each of the requesting component 104 and the specified targeted process 108 at respective ends of the inter-process communication channel 124 because requesting component 104 and specified targeted process 108 handle messages themselves, allowing for two way communications. Two ports are attached to each of the intermediate nodes 106A-106N to allow incoming calls to pass through from one of the ports to the other.

V. Other Example Embodiments Utilizing Interfaces

Following are some example embodiments that utilize the messaging interface and the discovery and selection interface described above in sections III. and IV., respectively. These example embodiments are provided for illustrative purposes and are not intended to be limiting. For instance, the requesting component is referred to below as an integrated development environment (IDE), and the specified targeted process is referred to below as a targeted web application, for illustrative purposes merely to illustrate example use case scenarios.

A. IDE and Targeted Web Application on Same Machine

One way to initiate a connection between a user's IDE and a targeted web application to enable the user to engage in diagnostics with regard to the specified targeted process will now be discussed. The IDE is the starting endpoint, and the targeted web application is the ending point. In the simplest case, this is a one hop attachment on the user's machine. The following discussion describes one example implementation of this simplest case. In accordance with this implementation, the user uses a user interface (UI) to select which process on her local machine she would like to target, and communications are established with that process. This may be implemented in accordance with the following steps:

1. The UI has access to an IDE component, which implements ISelectionAndDiscovery. The IDE component implements ISelectionAndDiscovery through built-in operating system mechanisms allowing it to enumerate processes and identify any that are advertising themselves as web application debugging targets.
2. The UI calls ISelectionDiscovery::GetAvailableTargetEndpionts( ), which returns a list of processes which the UI displays.
3. The user selects the desired target and the UI calls ISelectionAndDiscovery::SelectTargetEndpoint(Target) where "Target" identifies the process that the user selected. The IDE component stores the target in a port object which implements IMessageReceiver via the built-in operating system method of communication of anonymous pipes.
4. The IDE creates its diagnostic tools which communicate with the targeted web application using the returned IMessageReceiver interface, and the object ensures that the messages are sent.
5. The targeted web application, which has been listening for connections, receives a message from SelectTargetEndpoint from step 2 and constructs a mirrored port object using the pipes passed in that message.

It will be recognized that the implementation details of how the messages are de-serialized and serialized and how the communications are established may vary. Regardless, each node is capable of enumerating targets and then storing an indicator that specifies to which target future messages are to be sent. Each node is capable of listening for incoming connections and storing another indicator that specifies to which node return trip messages are to go.

B. IDE and Targeted Web Application on Different Machines

Implementations for initiating a connection between a user's IDE that is running on a first machine and a targeted web application that is running on a second machine are similar to the example implementation described above. However, these implementations bridge two communications mediums. For instance, messages from the IDE to the targeted web application first pass from the first machine to the second machine and then pass into the targeted web application. This may be achieved by running an agent on the second machine responsible for the process enumeration and selection side of the steps described above, establishing a connection from the agent into the targeted web application via anonymous pipes as described above, once a connection from the IDE to the agent has been made across the network. For instance, the remote agent may be referred to as an intermediate node. Initiating the connection across a machine boundary may be implemented in accordance with the following steps:

1. The UI has access to an IDE component, which implements ISelectionAndDiscovery. The IDE component implements ISelectionAndDiscovery as described above. The IDE also implements GetAvailableHops( ), which returns a list of computers that the IDE can access across the network discovered via normal (e.g., Windows®) networking methods. SelectTargetHop( ) can be called with one of these machines if discovered, or by specifying a machine based on the user's knowledge of the machine's IP address or other addressable name.
2. The IDE calls SelectTargetHop( ) with the second machine. This returns a reference to ISelectionAndDiscovery, implemented via a first port object that forwards its methods to the agent. The agent creates a corresponding second port object to respond. The second port object stores the state necessary to ensure that future messages and responses are sent back to the IDE.
3. The remote agent implements ISelectionAndDiscovery::GetAvailableTargetEndpoints as described above, by enumerating processes on the second machine. The IDE calls the methods implemented by the first port, which serialize the calls over the network to the second machine. The second port de-serializes the methods upon receipt.
4. The IDE calls ISelectionAndDiscovery::SelectTargetEndpoint( ) with the targeted web application selected by the user via the UI. The message is sent across the communications medium of the network via the first and second ports. The remote agent stores the state necessary to forward future communications to the targeted web application. The remote agent creates a third port object for pipe communications and signaling the targeted web application, which was listening for incoming requests (e.g., via windows mechanisms, such as a windows message, DCOM or other event). The remote agent creates a fourth port for the other side of the pipes (one going each way), allowing it to receive messages via that process's implementation of IMessageReceiver and send them by the second port's IMessageReceiver.
5. The IDE and the targeted web application now can communicate via their IMessageReceivers and that of the ports on each end, with the messages being forwarded between them by the intermediate hop through the agent, which has stored the required state to ensure that messages received from the IDE at the second port are forwarded toward the targeted web application by the third port, and messages received from the targeted web application at the third port are forwarded toward the IDE by the second port.

It will be recognized that further intermediate hops can be added via the same mechanism described above.

VI. Example Computer System

Figure 7:
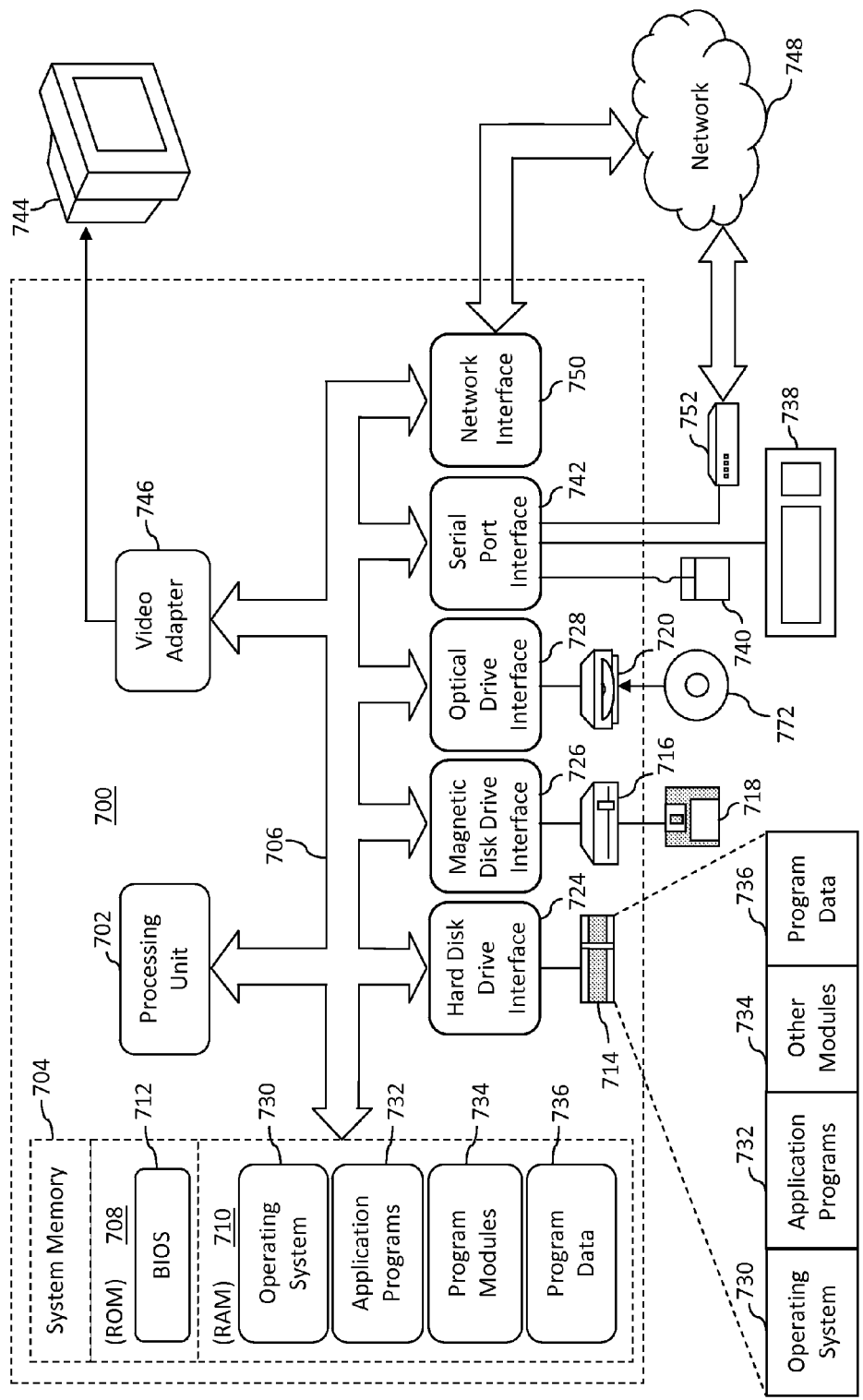
FIG. 7 depicts an example computer in which embodiments may be implemented.

FIG. 7 depicts an example computer 700 in which embodiments may be implemented. Any one or more of machine(s) 102 shown in FIG. 1, any one or more of machine(s) 402 shown in FIG. 4, or any one or more of machine(s) 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of any one or more of machine(s) 102, requesting component 104, any one or more of intermediate nodes 106A-106N, specified targeted process 108, first execution engine 112, second execution engine 114, any one or more of machine(s) 402, requesting component 404, specified targeted process 406, user interface 408, communication channel constructor 412, agent 414, query logic 416, selection logic 418, attachment logic 420, storage logic 422, determination logic 424, causation logic 426, error logic 428, synchronization logic 430, nodes 462, user interface 608, communication channel constructor 612, attachment logic 614, causation logic 616, establishment logic 618, synchronization logic 620, traversal logic 622, port logic 624, retaining logic 626, flowchart 200 (including any step of flowchart 200), flowchart 300 (including any step of flowchart 300), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable medium" are used to generally refer to non-transitory media such as the hard disk associated with hard disk drive 714, removable magnetic disk 718, removable optical disk 722, as well as other non-transitory media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

VII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system to construct a communication channel between a requesting component and a specified targeted process, the system comprising:
    at least one element including at least one of (a) one or more processors or (b) hardware logic/electrical circuitry;
    query logic, implemented using the at least one element, to provide an availability query to the requesting component in response to receipt of an attachment request via a user interface, the attachment request indicating that the requesting component is to be attached to the specified targeted process, the attachment request including a node indicator that specifies an order of a plurality of nodes with respect to which the communication channel is to be constructed, the requesting component being an originating node of the plurality of nodes, the specified targeted process being a destination node of the plurality of nodes, the requesting component being external to the specified targeted process, the availability query causing the requesting component to determine a plurality of available nodes based on receipt of a plurality of availability indicators from the plurality of respective available nodes, each of the plurality of availability indicators specifying that the respective available node is capable of communicating with the requesting component;
    selection logic to select the specified targeted process from the plurality of available nodes based on the node indicator;
    attachment logic to attach the requesting component to the specified targeted process to establish the communication channel therebetween in response to selection of the specified targeted process,
        the attachment logic to automatically generate a first port object that is associated with the requesting component, the first port object to serialize messages that are provided from the requesting component using the communication channel,
        the attachment logic to automatically generate a second port object that is associated with the specified targeted process in response to a determination that the requesting component is to be attached to the specified targeted process, the second port object to de-serialize messages that are received at the specified targeted process via the communication channel;
    storage logic to store a reference to the specified targeted process, the reference indicating that messages from the requesting component are to be sent to the specified targeted process via the communication channel while the requesting component is attached to the specified targeted process; and
    synchronization logic to synchronize a state of a tooling window of the requesting component with a state of the specified targeted process based on information regarding the specified targeted process that is received asynchronously at the requesting component via the communication channel, the tooling window to enable diagnostic operations to be performed with respect to the specified targeted process via an execution engine that is included in the specified targeted process, the execution engine having an execution context that is different from an execution context of the specified targeted process, which includes the execution engine, to at least hinder execution of the execution engine from interfering with execution of the specified targeted process.

2. The system of claim 1, wherein the first port object is further to de-serialize messages that are received at the requesting component from the specified targeted process;
wherein the second port object is further to serialize messages that are provided from the specified targeted process to the requesting component; and
wherein the storage logic is to store a second reference to the requesting component, the second reference indicating that messages from the specified targeted process are to be sent to the requesting component while the requesting component is attached to the specified targeted process.

3. The system of claim 2, further comprising:
determination logic to determine whether a designated port object is disabled, the designated port object being the first port object or the second port object, the determination logic further to send an instruction to causation logic that instructs the causation logic to cause the first port object or the second port object that is not the designated port object to be disabled; and
the causation logic to cause the first port object or the second port object that is not the designated port object to be disabled in response to receipt of the instruction from the determination logic as a result of the designated port object being disabled.

4. The system of claim 2, further comprising:
determination logic to determine whether an error occurs with regard to the communication channel;
causation logic to halt attempts to cause communication between the first port object and the second port object via the communication channel in response to a determination that the error occurs with regard to the communication channel; and
error logic to provide an error indicator via the user interface to indicate that the error occurs with regard to the communication channel.

5. The system of claim 1, wherein the requesting component executes on a first machine;
wherein the specified targeted process executes on a second machine that is different from the first machine;
wherein the query logic is further to provide an accessibility query to the requesting component, the accessibility query causing the requesting component to determine one or more accessible machines in a networked computer system that are accessible to the first machine in accordance with a computer networking protocol, the one or more accessible machines including the second machine;
wherein the system further comprises:
selection logic to select the second machine from the one or more accessible machines based on a selection instruction that is received in response to a determination of the one or more accessible machines; and
wherein the attachment logic is to cause an agent to execute on the second machine, the agent to facilitate the construction of the communication channel between the requesting component and the specified targeted process.

6. The system of claim 5, wherein the first port object is to serialize messages that are provided from the requesting component toward the agent;
wherein the attachment logic is to automatically generate a third port object that is associated with the agent, the third port object to de-serialize messages that are received at the agent from the requesting component; and
wherein the attachment logic is to automatically generate a fourth port object that is associated with the agent, the fourth port object to serialize messages that are provided from the agent toward the specified targeted process.

7. The system of claim 6, wherein the first port object is further to de-serialize messages that are received at the requesting component from the agent;
wherein the third port object is further to serialize messages that are provided from the agent toward the requesting component;
wherein the fourth port object is further de-serialize messages that are received at the agent from the specified targeted process;
wherein the second port object is further to serialize messages that are provided form the specified targeted process toward the agent; and
wherein the storage logic is to store a second reference to the requesting component, the second reference indicating that messages from the specified targeted process are to be sent to the requesting component while the requesting component is attached to the specified targeted process.

8. The system of claim 1, further comprising:
causation logic to cause a dynamic language execution engine in a wrapper object, which is hosted in the specified targeted process, to be activated in response to attaching the requesting component to the specified targeted process.

9. The system of claim 1, further comprising:
determination logic to determine that the plurality of available nodes includes one or more stubs of code that are not activated;
causation logic to cause the requesting component to provide at least one activation request to at least one respective available node of the plurality of available nodes that includes at least one respective non-activated stub of code, each of the at least one activation request to cause the respective non-activated stub of code to load one or more objects to provide respective activated code.

10. The system of claim 1, wherein the first port object is to implement an interface via a built-in operating system method of communication of anonymous pipes; and
wherein the attachment logic is to automatically generate the second port object using the anonymous pipes; and
wherein the requesting component is to provide diagnostic tools to communicate with the specified targeted process using the interface, the diagnostic tools enabling the requesting component to perform diagnostic operations with respect to the specified targeted process while the specified targeted process is running.

11. The system of claim 1, wherein the execution engine is to enable the requesting component to at least one of control the specified targeted process while the specified targeted process is running, identify a source of a problem with respect to the specified targeted process while the specified targeted process is running, or debug the specified targeted process while the specified targeted process is running via an execution engine that is included in the specified targeted process.

12. A system to construct a communication channel having a plurality of links between a requesting component and a specified targeted process, the system comprising:
at least one element including at least one of (a) one or more processors or (b) hardware logic/electrical circuitry;
attachment logic, implemented using the at least one element, to attach the requesting component to the specified targeted process in response to receipt of an attachment request via a user interface, the attachment request indicating that the requesting component is to be attached to the specified targeted process, the requesting component being external to the specified targeted process, said attachment logic comprising:
traversal logic to traverse the plurality of links to discover the specified targeted process using one or more first availability indicators received from one or more respective intermediate nodes that are between the requesting component and the specified targeted process and a second availability indicator received from the specified targeted process, each of the one or more first availability indicators specifying that the respective intermediate node is capable of communicating with the requesting component, the second availability indicator advertising the specified targeted process as a web application debugging target that is capable of communicating with the requesting component, each of the plurality of links being defined by a respective pair of nodes in a plurality of nodes, the requesting component being an originating node of the plurality of nodes, the specified targeted process being a destination node of the plurality of nodes, the plurality of nodes including one or more intermediate nodes between the requesting component and the specified targeted process;
establishment logic to establish the communication channel, said establishment logic comprising:
retaining logic to retain node information in each node of a subset of the plurality of nodes regarding a next consecutive node of the plurality of nodes to which messages from the requesting component to the specified targeted process are to be delivered, the subset including the requesting component and the one or more intermediate nodes; and
synchronization logic to synchronize a state of a tooling window of the requesting component with a state of the specified targeted process based on process information regarding the specified targeted process that is received asynchronously at the requesting component via the communication channel, the tooling window is to enable the requesting component to at least one of control the specified targeted process while the specified targeted process is running, identify the source of the problem with respect to the specified targeted process while the specified targeted process is running, or debug the specified targeted process while the specified targeted process is running via an execution engine that is included in the specified targeted process, the execution engine having an execution context that is different from an execution context of the specified targeted process, which includes the execution engine.

13. The system of claim 12, wherein the retaining logic is further to retain second node information in each node of a second subset of the plurality of nodes regarding a next consecutive node of the plurality of nodes to which messages from the specified targeted process to the requesting component are to be delivered, the second subset including the specified targeted process and the one or more intermediate nodes.

14. The system of claim 12, wherein each of the one or more intermediate nodes is an arbitrary node to discover processes at the respective arbitrary node and processes at others of the plurality of nodes that are accessible from the respective arbitrary node.

15. The system of claim 12, wherein the establishment logic further comprises:
port logic to automatically generate a first pair of communication ports for each link of the plurality of links, each first pair of communication ports including a respective send port and a respective receive port, the respective send port to send messages that are from the requesting component toward the specified targeted process, the respective receive port to receive message from the send port in the respective first pair; and
wherein the port logic is further to automatically generate a second pair of communication ports for each link of the plurality of links, each second pair of communication ports including a respective send port and a respective receive port, the respective send port to send messages that are from the specified targeted process toward the requesting component, the respective receive port to receive message from the send port in the respective second pair.

16. The system of claim 12, wherein the execution engine is a dynamic language execution engine in a wrapper object, which is hosted in the specified targeted process; and
wherein the system further comprises:
causation logic to cause the dynamic language execution engine to be activated in response to the requesting component being attached to the specified targeted process.

17. The system of claim 12, comprising:
logic to launch a plurality of windows of a designated kind for a plurality of target processes to enable comparison of data of a same kind for the plurality of target processes.

18. A computer program product comprising a computer-readable medium having computer program logic recorded thereon for enabling a processor-based system to construct a communication channel having a plurality of links between a requesting component and a specified targeted process, the computer program product comprising:
a first program logic module for enabling the processor-based system to attach the requesting component to the specified targeted process in response to receipt of an attachment request via a user interface, the attachment request indicating that the requesting component is to be attached to the specified targeted process, the requesting component being external to the specified targeted process, the first program logic module including logic for enabling the processor-based system to traverse the plurality of links to discover the specified targeted process, each of the plurality of links being defined by a respective pair of nodes in a plurality of nodes, the requesting component being an originating node of the plurality of nodes, the specified targeted process being a destination node of the plurality of nodes, the plurality of nodes including one or more intermediate nodes between the requesting component and the specified targeted process; and a second program logic module for enabling the processor-based system to establish the communication channel to enable activation of an execution engine within the specified targeted process while the specified targeted process is running, activation of the execution engine enabling the requesting component to perform diagnostic operations with respect to the specified targeted process via the execution engine that is included in the specified targeted process while the specified targeted process is running without interfering with execution of the specified targeted process, the execution engine having an execution context that is different from an execution context of the specified targeted process, which includes the execution engine, the second program logic module including logic for enabling the processor-based system to retain first node information in each node of a first subset of the plurality of nodes regarding a next consecutive node of the plurality of nodes to which messages from the requesting component to the specified targeted process are to be delivered, the first subset including the requesting component and the one or more intermediate nodes, the second program logic module further including logic for enabling the processor-based system to retain second node information in each node of a second subset of the plurality of nodes regarding a next consecutive node of the plurality of nodes to which messages from the specified targeted process to the requesting component are to be delivered, the second subset including the specified targeted process and the one or more intermediate nodes.

19. The computer program product of claim 18, wherein the second program logic module comprises:

logic for enabling the processor-based system to launch a plurality of windows of a designated kind for a plurality of target processes to enable comparison of data of a same kind for the plurality of target processes.

20. The computer program product of claim 18, wherein the logic for enabling the processor-based system to traverse the plurality of links is to discover the specified targeted process based on the specified targeted process advertising itself as a debugging target.

* * * * *